United States Patent Office 3,490,827
Patented Jan. 20, 1970

3,490,827
METHOD AND APPARATUS FOR SPECKLE REDUCTION IN THE RECONSTRUCTION OF HOLOGRAPHIC IMAGES
Raoul F. van Ligten, Worcester, and Elias Snitzer, Sturbridge, Mass., assignors to American Optical Corporation, Southbridge, Mass., a corporation of Delaware
Filed Oct. 19, 1967, Ser. No. 676,556
Int. Cl. G02b 27/00
U.S. Cl. 350—3.5                                    11 Claims

ABSTRACT OF THE DISCLOSURE

Apparatus and method for removing or reducing speckle in reconstructed holographic images. A moving scatterer is placed near the source used to reconstruct the image. The scatterer provides a strong radiation lobe in the forward direction and a number of weaker lobes in other directions. Although the scatterer is moved constantly, the strong lobe is always present in the forward direction and results in the reconstruction of reinforced information images. Because the weaker side lobes are constantly changing in directions the speckle patterns are varied in time. The integrated reconstructed images still contain a speckle level, but because of the constant variations in the individual speckle patterns the perceived average speckle pattern is more uniform and does not detract from the detail of the reconstructed image.

---

This invention relates to holography and more particularly to methods and apparatus for the elimination of speckle patterns in reconstructed holographic images.

In the construction of a hologram, a record is made of the interference pattern developed by reference coherent light and coherent light of the same wavelength reflected from the object under consideration. The hologram can be thought of as a record of the arrestment of an expanding electromagnetic field from the object. To reconstruct an image of the object, coherent light is passed through the hologram. The effect is as though the previously arrested electromagnetic field had been released, i.e., permitted to continue propagation without modification. Little difference exists between viewing the original object field and the reconstructed image field.

Except in very special circumstances, ordinary light sources are inadequate for use in holography because of their lack of spatial and temporal coherence. With the advent of the laser, however, considerable attention has been given to the field of holography. Although many techniques for constructing holograms and reconstructing images from them have been developed, they all result in speckle in the reconstructed images. The speckle pattern, which typically consists of numerous small light blotches, and is an overall non-information carrying pattern (sometimes hereinafter referred to as "background") is annoying to the observer and may be intolerable in an application where details of the reconstructed object are of the same order of magnitude in size as that of the speckle "noise."

The appearance of speckle is characteristic of objects illuminated by laser light. Speckle is observed when looking at an object illuminated by laser light—even divorced from a holographic set-up. Since the speckle is a component of the overall image perceived, it is also reproduced in a hologram. Consequently, the reconstructed image also exhibits speckle.

It has been suggested that the speckle which is observed in objects illuminated by laser light could be diminished by the incorporation into the illuminating laser beam of a moving scatterer, such as a rotating ground glass. In such laser illuminating system, the presence of the moving scatterer, which can be disposed at any location along the length of the laser beam, tends to average out the speckle pattern thereby rendering the visible speckle less pronounced. Attempts to carry over this concept into the making of a hologram have been unsuccessful, resulting in the destruction of the required interference patterns in the hologram-recording medium.

It is a general object of this invention to provide a method and apparatus for use in holographic image reconstruction to reduce the severity of speckle by providing a more uniform and less discernible speckle pattern.

Briefly, in accordance with the principles of our invention some of the laser light used in the reconstructing system is scattered slightly prior to its transmission through the hologram. The scattering pattern is varied continuously. Most of the laser light is transmitted in the forward direction without being affected by the scatterer. Some of the light, however, is scattered slightly and is continuously changing directions. This can be achieved with the use of a scatterer providing a strong radiation lobe in the forward direction and some weaker lobes in other directions. By continuously moving the scatterer, the weaker lobes change in direction while the direction of the strong forward lobe remains unchanged.

As a result of the transmission of the reconstructing laser light through the hologram, the major portion of the light, that part which is not initially scattered, provides a true image of the original object. The varying weaker side lobe light, however, results in constantly changing speckle patterns. The eye of the observer (or a photographic film, etc.) in effect integrates the successive speckle patterns so that the random noise establishes a uniform speckle or noise level. Thus, the reconstructed image is seen against a greatly subdued and uniform speckle pattern which does not inhibit the perception of detail.

It is a feature of our invention to scatter slightly and in a continuously variable manner the coherent light used in the reconstruction of a holographic image.

Further objects, features and advantages of the invention will become apparent upon consideration of the following detailed description in conjunction with the drawing, in which.

In order to understand the many applications of the present invention, it is essential to understand holography, and in particular the manner in which a hologram is constructed and the image recorded thereon reconstructed. The coherent illumination of an object with a light source, such as a laser, produces for each object point radiating light waves on expanding spherical wavefronts. In any given reference plane, all of these wavefronts provide a composite complex electromagnetic field, with each elemental wavefront possessing properties of relative phase and amplitude which are characteristic of the object. With a hologram, this ever-expanding electromagnetic field and relative phase and amplitude information is arrested in a given reference plane and recorded in any appropriate manner (i.e., on a photographic film). All of the information which is uniquely characteristic of the expanding electromagnetic field and the corresponding object point of a three-dimensional object are preserved on the hologram. The relative phase of any elemental wavefront and its obliquity to the reference plane in which the hologram is made is determined by the relative position in space occupied by the radiating object point. The amplitude of such elemental wavefront is determined by that object point's reflectance and or transmittance and the distance of the elemental wavefront from the object point.

In the making of a hologram, the coherent light may either impinge upon an opaque object and be reflected therefrom or the coherent light may be passed through a partially transparent object. The coherent light, after being subjected to the object being viewed, records the required information on the hologram to subsequently allow reconstruction of an image of the object. While both film and the retina of the human eye are sensitive to light intensity, neither can detect phase which is an essential channel of information to retain the complete characteristics of the three-dimensional object. In holography, the recordation of all available information is accomplished by introducing a reference beam which passes from the source directly to the photographic film where it interacts with the light emanating from the object to record on the hologram all of the phase and amplitude information uniquely characteristic of the object field for subsequent reconstruction of an image of such object field. For a detailed description of the underlying phenomena of holography, reference may be made to a paper entitled "The Hologram and its Ophthalmic Potential" which appeared in the American Journal of Optometry and Archives of the American Academy of Optometry, June 1966 (pp. 1–13).

The present invention finds application in a wide variety of systems for reconstructing holograms including, without limitation, those in which the hologram was originally constructed with collimated or plane wavefronts or with spherical wavefronts, and with diverging and converging light beams. It will also be appreciated as the description proceeds that the invention finds useful application for the direct viewing of a reconstructed image from a hologram or for the viewing of the image with the aid of an optical instrument, and in particular in holographic microscopy.

Figures 1, 1A, 1B:
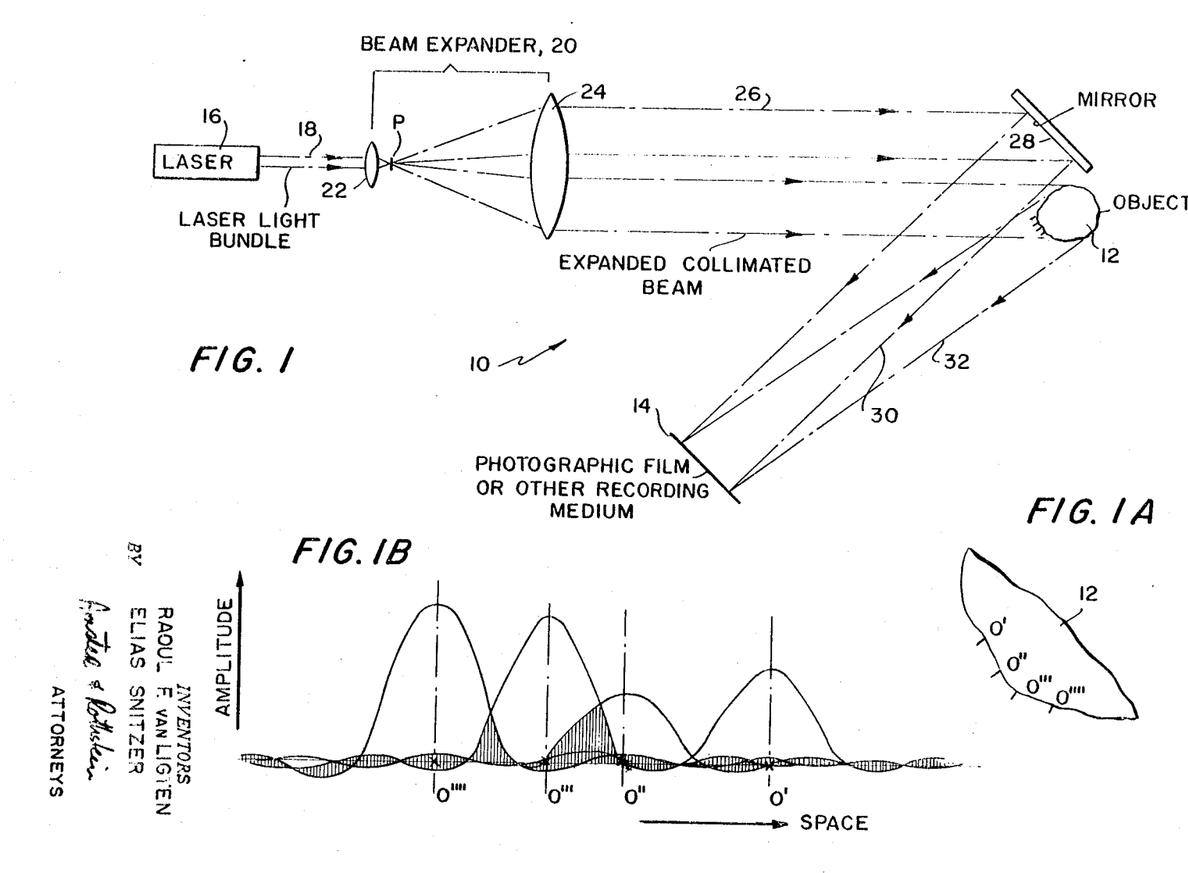
FIG. 1 is a schematic representation of a typical system for constructing a hologram.
FIG. 1A shows, on a greatly enlarged scale, a portion of the object shown in FIG. 1.
FIG. 1B shows typical distributions of laser light reflected from four very close object points on the object of FIGS. 1 and 1A.
Figure 2:
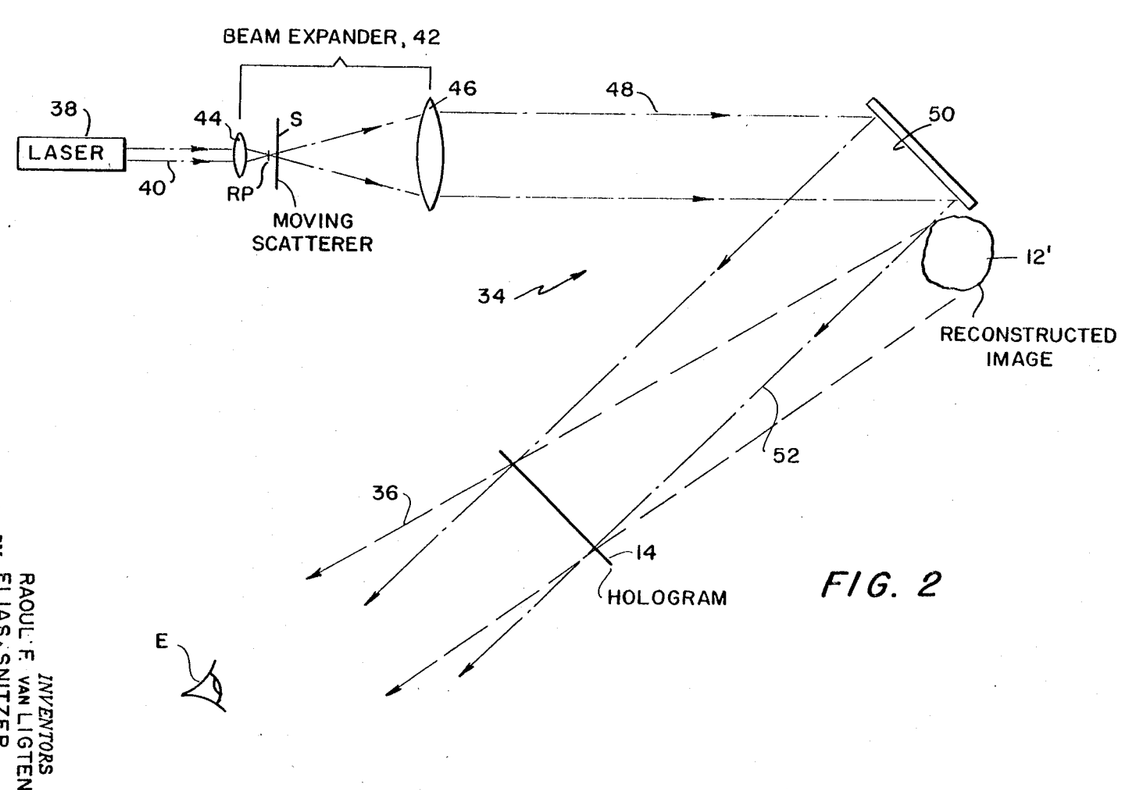
FIG. 2 is a schematic representation of a system for reconstructing a holographic image.

There now follows in conjunction with FIGS. 1 and 2 a description of a typical, but nonetheless illustrative, system for constructing a hologram and reconstructing an image therefrom in accordance with the present invention. Referring specifically to FIG. 1, there is shown schematically and diagrammatically a system, generally designated by the reference numeral 10, for constructing a hologram. The hologram-making system 10 utilizes collimated or plane waves for illuminating the object 12 and for establishing the requisite reference beam, and records the necessary information on a photographic film or other recording medium 14. Specifically, a laser source 16 is provided which produces a laser light bundle 18. Typically, the laser 16 may be a ruby or gas laser which produces a beam 18 of a wavelength compatible with the recording medium or film 14. The coherent light bundle 18 is passed through a beam expander 20 which includes two optical systems 22, 24, illustrated for simplicity as being single lenses having focal points which are coincident or nearly coincident. Various types of beam expanders 20 may be employed to increase the cross-section of the original light bundle 18 to produce an expanded bundle 26 which is then passed to a mirror 28 and to a three-dimensional object 12. As is generally understood the mirror 28 produces a reference beam 30 while the object 12 produces a reflected object beam 32. The reference beam 30 interacts with the object beam 32 to produce the required interference pattern containing the phase and amplitude information related to the object 12 which the recording medium accepts and retains for subsequent reconstruction of an image of the object.

In FIG. 2, there is illustrated a typical reconstruction system 34 for reconstructing an image in space of the object 12 recorded on the hologram produced in the first instance with the construction system illustrated in FIG. 1. The elemental and illustrative reconstruction system 34 includes no optics for viewing the reconstructed image 12'. Rather, the viewer places his or her eye E at a viewing position appropriate to receive the reconstructed image-carrying bundle 36 as it emanates from the hologram 14. Specifically, the reconstruction system 34 includes a laser 38 which preferably produces a laser light bundle 40 of the same wavelength as employed in originally constructing the hologram 14. As it is generally understood by those skilled in the art, a laser output of a different wavelength may be used to reconstruct the image 12' from the hologram 14. Depending upon the wavelength difference, there will be differences in the magnification of the reconstructed image 12'. The reconstruction laser light bundle 40 is passed through a beam expander 42 including optical systems 44, 46 to produce an expanded beam 48 of a size sufficient to eliminate the entire hologram 14. The expanded beam 48 is reflected by mirror 50 onto the hologram 14, with the mirror producing a reconstruction beam 52. A folded optical system is disclosed in the illustrative reconstruction arrangement of FIG. 2 to bring the same into a close optical parallelism with the hologram-producing system of FIG. 1 for simplicity in understanding. However, it will be appreciated that the expanded beam 48 may be applied directly to the hologram to serve as the reconstruction bundle. As is generally understood, when the hologram-making system 10 includes coherent light emanating from a reference point P (see FIG. 1), it is essential in the reconstruction system 34 to provide a corresponding reconstruction point RP. However, in the illustrative system, the reconstruction point RP is not critically related to the total path length from the reconstruction point to the hologram in that this hologram was produced with collimated or plane waves. As will be described hereinafter, the spacing of the reconstruction point to the hologram is important when employing systems wherein spherical, diverging or converging reference bundles are employed in the initial production of the hologram. For the illustrative reconstruction system, it is also generally understood that the hologram 14 will produce another reconstructed image in addition to virtual image 12'. Such additional image is of no interest in this illustrative embodiment and therefore is not illustrated, and will not be further described. However, it is to be expressly understood that the present invention finds useful application in improving such additional image. Further, as is generally understood, appropriate optics may be provided in alignment with the reconstructed image-carrying bundle 36 to aid the viewer in observing the reconstructed image 12'.

The reconstructed image 12' will be a faithful reproduction of the object 12 but will include a speckled background produced as a result of the original illumination of the object with the coherent or laser light source and extraneous artifacts, such as film granularity and dust particles in the optical system. As heretofore indicated, this speckle background pattern, which is characteristic of objects illuminated by laser light, is troublesome. Such speckle may become intolerable in those applications where details in the reconstructed object are of the same order of magnitude of the speckles since such speckles will obscure recognition of details. Particularly in the field of microscopy, where such fine details are often highly significant, the presence of the speckles limits the usefulness and efficacy of holographic techniques.

An understanding of the speckle phenomenon is best had by a consideration of the hologram-making system of FIG. 1, the reconstruction system of FIG. 2 and the detailed showing in FIGS. 1A and 1B. In FIG. 1A, there is shown, on a greatly enlarged scale, a portion of the object 12 having four closely adjacent object points 0', 0'', 0''' and 0'''', such four object points being illustrative of the infinite number of such points on the object 12. In FIG. 1B, there are shown typical, but purely illustrative amplitude distributions due to the incident coherent light on the four object points. These illustrative localized amplitude patterns, recorded on the hologram, are spaced from each other in accordance with the spacing of the object points 0', 0'', 0''', 0'''' and are of amplitudes indicative of the reflectance (or transmittance) of these points. The amplitude distributions in FIG. 1B are plotted as a function of space as traced along lines in the image plane. The point spreads arise as a result of the illumination of the object with coherent light, such spread occurring as a result of numerous factors including, without limitation, scattering at the object, dust particles in the optical system, wave front aberrations in the optical system, diffusion at the recording medium, etc. The speckle seen when any object is illuminated by laser light, even in a non-holographic system, is recorded on the hologram. The localized amplitude patterns, as a result of the point spreads interfere with each other as shown in FIG. 1B, the shaded area representing the speckle. The speckle produced by the illuminating coherent source 16 of the hologram-making system 10 is thus recorded in the hologram 14 along with the desired object information and is reproduced by the reconstruction system 34. As it is generally understood, when totally incoherent illumination is used to illuminate an object (i.e., conventional light), adjacent or near adjacent image points will find no opportunity to interfere with each other. With totally incoherent light, the energy of one point of the image is given by the sum of the energies of contribution of all neighboring and near-neighboring image points and corresponding localized amplitude patterns. The sum produces a uniform background when illuminating with totally incoherent light, as contrasted to the non-uniform or speckled background produced when illuminating with coherent light.

In accordance with the present invention, a moving scatterer S is introduced into the reconstruction system at a location carefully selected in relation to the reconstruction point RP. The scatterer S introduces additional speckle patterns, which speckle patterns are varied in time and rapidly presented to the observer such that the total speckle pattern is made uniform. This presents a new threshold background which does not interfere with or obscure the detail of the reconstructed image 12'. The additional speckle patterns, which are spaced in time and rapidly presented to the viewer who perceives only an integral pattern, are produced in a manner wherein the useful or desired optical information which produces the reconstructed image 12' is enhanced and reinforced over the now uniform background. Stated somewhat differently, there is produced in accordance with the present invention a set of images which are mutually incoherent. Each image of the set contains a background noise or speckle pattern which is different from one image to another of the set. Each image of the set will also contain the useful image which is the same in all images of the set. Upon incoherent addition of all elements in this set of images, the random background noise will establish a uniform background level, while the useful images will add up to an enhanced image of interest. The intensity of the useful image relative to the uniform background level will be enhanced (as compared to the same ratio for each individual element of the set of images) because of the summation of the plural images of the set. As viewed by the observer, the end result will be a more pronounced reconstructed useful image of interest, with a highly subdued and substantially uniform background which, although still speckled, will not detract from the detail of the reconstructed image.

There are numerous scatterers which may be employed for improving the quality of reconstructed holographic images in accordance with the present invention. One simple and practical approach is to employ a rotating ground glass in the reconstruction beam which is appropriately placed relative the reconstruction point RP, as will be detailed hereinafter. Although the use of such rotating ground glass will now be described in detail, it is to be understood that other types of moving scatterers S also find useful application in accordance with the present invention including, without limitation, multiple lenses, moving Fresnel zone plates, colloidal solutions (i.e., milk) and other periodic and random moving mechanisms for producing a continuously changing scatter of the reconstruction beam.

Figure 2A:
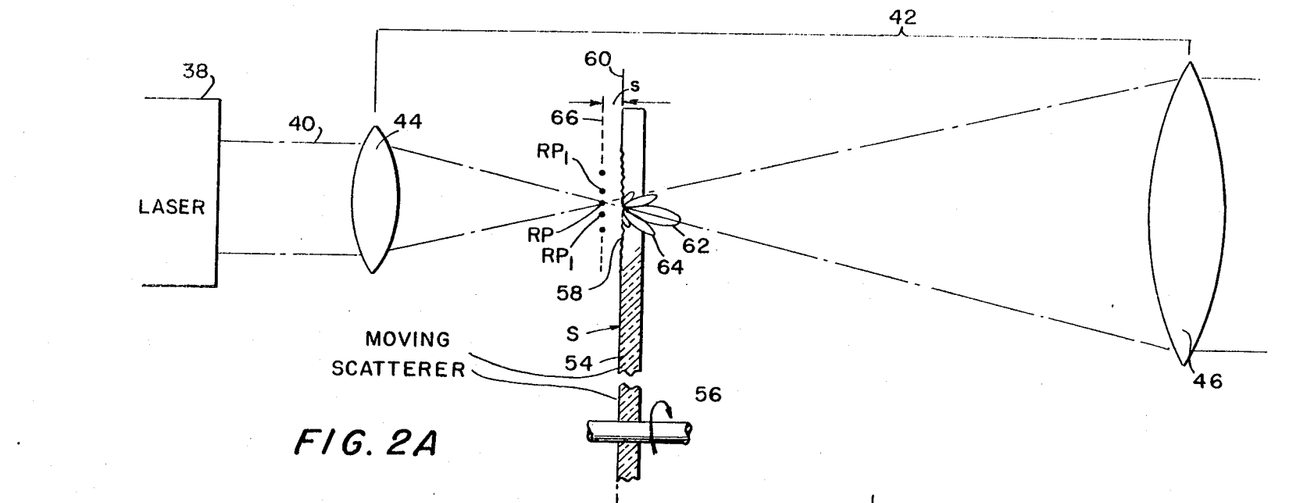
FIG. 2A is an enlarged view of the beam expander shown in FIG. 2.

As seen best in FIG. 2A, which is an enlarged view of beam expander 42 of FIG. 2, the moving scatterer S may take the form of a ground glass plate 54 which is mounted for rotation on shaft 56 at an appropriate speed. The speed of rotation is not critical and may range anywhere from 10 r.p.m. upwards, depending upon the radial distance from the axis of rotation to the operative portion of the glass 54, the wavelength of the laser output, the size of the random structure formed on the ground face 58 and other variables which must be taken into consideration in specialized situations. The optimum speed in any system is best determined by trial-and-error. The ground glass face 58 is disposed in a plane 60 which is spaced from the reconstruction point RP by the distance $s$ (see the enlarged showing in FIG. 2D). The spacing $s$ of the ground glass face 58 from the reconstruction point RP is selected as hereinafter detailed to provide a multiplicity of secondary reconstruction points $RP_1$, without appreciably enlarging the primary reconstruction point RP and bringing about a corresponding degradation in the resolution of the image of interest. Still considering FIG. 2A, the ground glass 54, when stationary, will produce a characteristic radiation pattern including a strong forward lobe 62 and a large number of side lobes 64. The strong forward lobe 62 produces a corresponding strong forward transmission of the primary reconstruction point RP, while the multiplicity of angularly extending side lobes will produce corresponding weaker secondary reconstruction points $RP_1$ distributed in the same plane as the reconstruction point RP. This produces a plane of reconstruction points, generally designated by the reference numeral 66, which is spaced from the ground glass face 58.

The multiplicity of secondary reconstruction points $RP_1$ will produce the desired random speckled background, yet the spread of the primary reconstruction point (represented by the dimension $d$ in FIG. 2D) will not appreciably degrade the resolution of the reconstructed image upon proper selection of dimension $s$. The function of the moving scatterer is to produce, as far as the observer's eye is concerned, a set of background images which are different from each other due to the randomness of the side lobes 64 of the ground glass 54. The scatter will also produce a set of images of interest which are not random and are of a magnitude determined by the strong forward lobe 62 of the ground glass 54. It will thus be appreciated that the moving scatterer, in conjunction with the eye of the observer, will integrate the mutually incoherent images due to the randomness of the speckle and reinforce the image of interest, providing a reconstructed image against a greatly subdued and uniform background which does not inhibit the usual perception of detail.

Figure 2B:
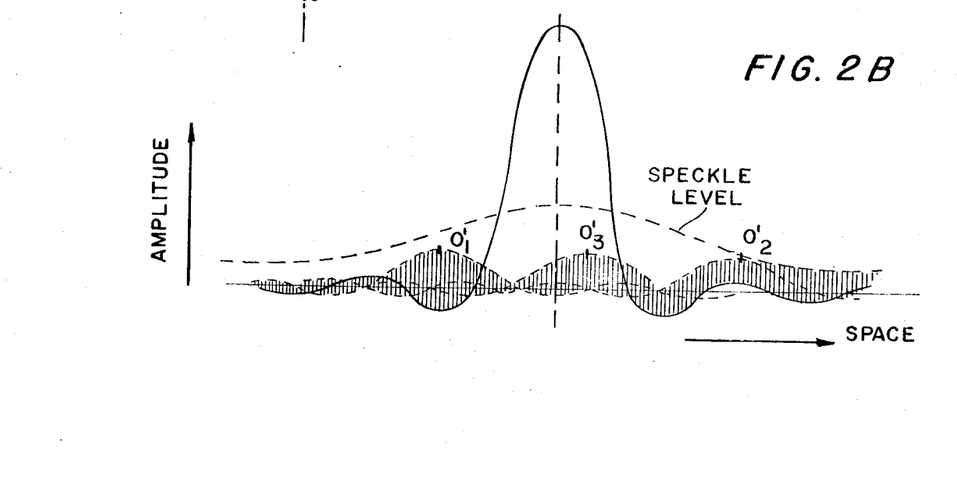
FIGS. 2B and 2C depict illustrative distributions of laser light reflected from a single object point which will be helpful in an understanding of the invention.
Figure 2C:
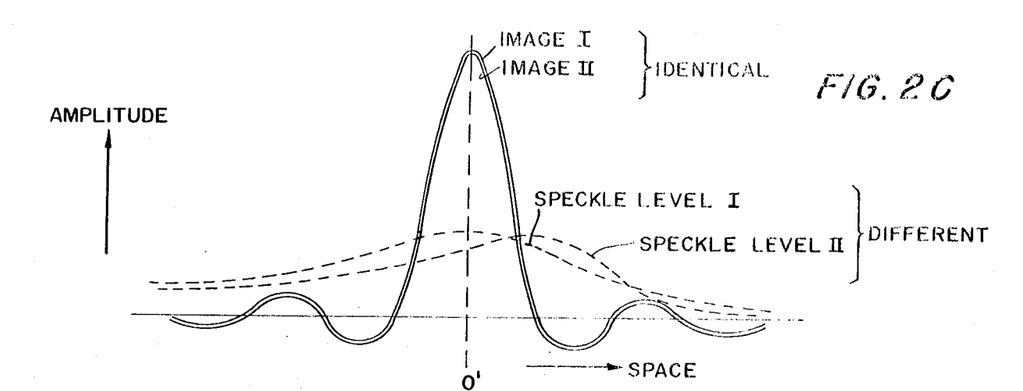

The function of the moving scatterer S in the present reconstruction system may better be understood by reference to FIGS. 2B and 2C. In FIG. 2B, one localized primary amplitude pattern associated with the object point 0′ (see FIG. 1B) is illustrated, along with the secondary localized amplitude patterns of reduced level produced by the secondary reconstruction points introduced into the system by the scatterer. For this illustration, the scatterer is considered to be stationary. The scatterer produces the secondary localized amplitude patterns $0_1′$, $0_2′$, $0_3′$ which are of a magnitude, number and in a spatial relation determined by the construction of the scatterer. These secondary localized patterns interfere with each other and with the primary pattern of interest to produce a pattern of speckle which would still be undesirable if the scatterer remained stationary. The sum of the secondary localized patterns produces an average speckle level which is of a relatively low magnitude as compared to the primary localized pattern of interest. It will be appreciated that different average speckle levels will be produced by the multiple secondary localized patterns associated with each primary pattern and each object point (see FIG. 1B).

The results produced by movement of the scatter (i.e., rotation) are best appreciated by reference to FIG. 2C. As the scatter is moved, the eye will retain (i.e., by persistence of vision) the successive images associated with the many object points from which the image is reconstructed, with the identical images of interest produced by each image point being superimposed and reinforcing and enhancing each other, as illustrated in the most elemental form in this figure and designated as "Image I" and "Image II." Concurrently, the eye will retain the speckle levels associated with the respective images (i.e., Speckle Level I and Speckle Level II). These speckle levels are not only different from each other but in addition also include different speckle patterns. The result of averaging by the human eye will be to enforce the image of interest and to subdue the speckle levels, as well as to average the speckle or noise information contained in each instantaneous image.

It will of course be appreciated that the reference to the human eye in describing this system is in no wise intended to be limiting. The human eye, photographic films and other two dimensional arrays of detectors for recording radiation in the optical spectrum will have a typical observation time and will integrate the visual information presented within that observation time. Thus, the observation of enhanced reconstructed images in accordance with the present invention may be achieved either by the human eye or by comparable recording media.

Figure 2D:
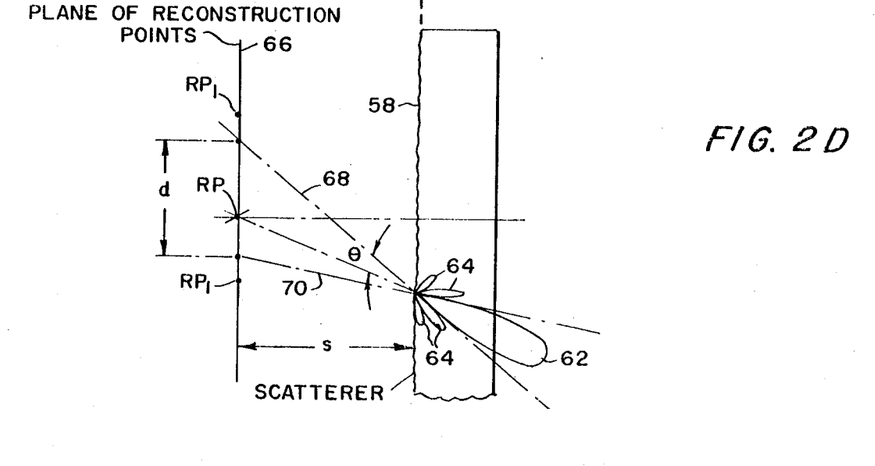
FIG. 2D is an enlarged view of a portion of FIG. 2A and is useful in identifying certain critical dimensions to be described below.

Referring to FIG. 2D, the considerations for the placement of the moving scatterer relative to the plane of reconstruction points 66 will now be described. If the effective plane 60 of the scatterer were to contain the reconstruction point RP, then the scatterer would not produce secondary reconstruction points $RP_1$. Thus, the scatterer must be spaced from the reconstruction point RP. Spacing of the scatterer from the reconstruction point RP produces the secondary reconstruction points $RP_1$, but also brings about an enlargement of the primary reconstruction point RP. Increasing the radial dimension $d$ of the reconstruction point RP manifests itself in the reconstructed image as a loss of resolution. Thus, a compromise must be arrived at between the necessity and desirability of establishing secondary reconstruction points $RP_1$ for the effective elimination of the speckle, yet without appreciably affecting the resolution of the reconstruction system. In any given system, the forward lobe 62 of the scatterer is determined. Construction lines 68, 70 are drawn tangent to the sides of the forward lobe 62 and extended back into the plane 66 of secondary reconstruction points. This provides an indication of the enlargement of the primary reconstruction point RP and the corresponding loss of resolution in this system as a function of the distance $s$. The following formula can be derived wherein $s$ is the spacing along the optical axis of the system between the effective plane of the scatterer 60 and the plane 66 of secondary reconstruction points, $d$ is the diameter of the expanded primary reconstruction point RP and the angle $\theta$ is the included angle between the tangential construction line 70: $s = d/(2 \tan \theta)$.

In any given system, the resolution will determine the permissible variation in dimension $d$ which may be expressed in any convenient units (i.e., microns). From this, the distance $s$ may be established from the reconstruction point RP. For any given scattering plate the value of $\theta$ is fixed. The maximum tolerable value of $d$ can be determined by experimentation. Thereafter, the scatterer is placed such that the dimension $s$ is less than or equal to $d/(2 \tan \theta)$. In a typical system for the reconstruction of images from holograms in holographic microscopy, the ground glass face 58 is spaced from the plane of reconstruction points a distance of 4 mm.; the operative portion of the rotating ground glass is spaced approximately 5 cm. from the axis of rotation; and the disc is rotated at a speed of approximately 60 r.p.m.

When the scatterer is placed at an axial distance away from the reconstruction point source, it will appear as if there is one strong central point source with many other much weaker sources distributed around the central source. It is by moving the scatterer, perpendicular to the axis of the reconstruction light bundle, that the weak points vary in position while the strong central point remains unchanged. This results in the desired effect of a varying speckle pattern which is incoherent between successive locations on the scatterer.

Figure 3:
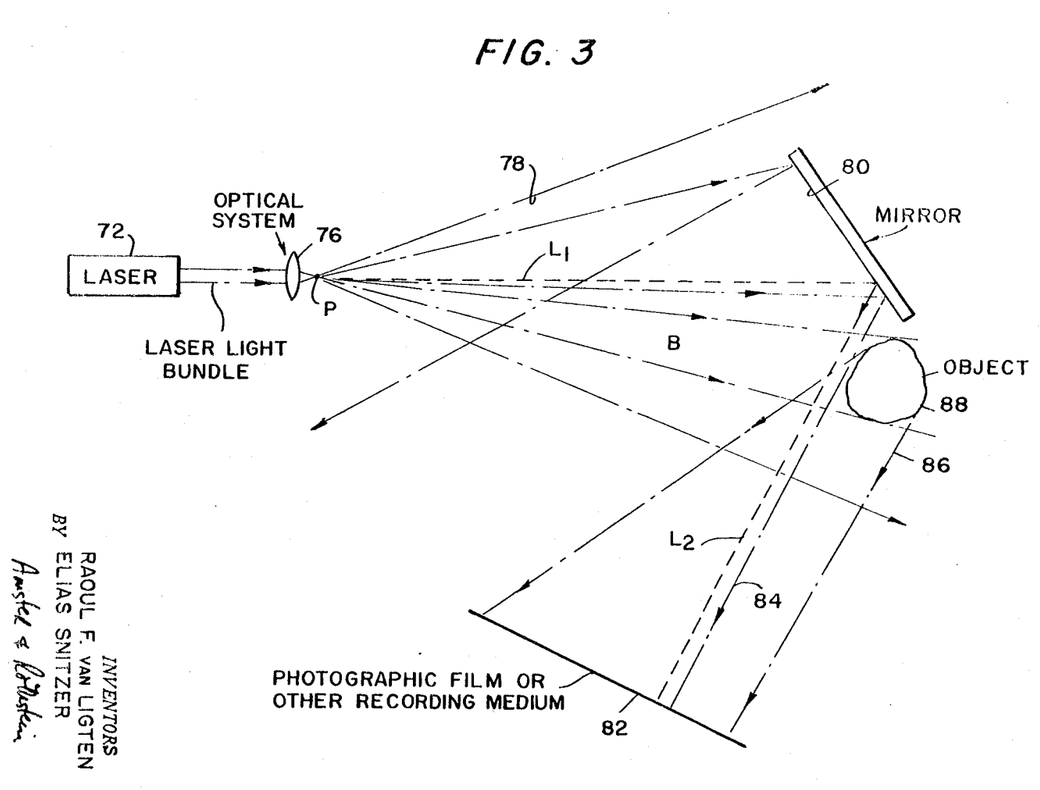
FIG. 3 is another representative system for constructing a hologram.
Figure 4:
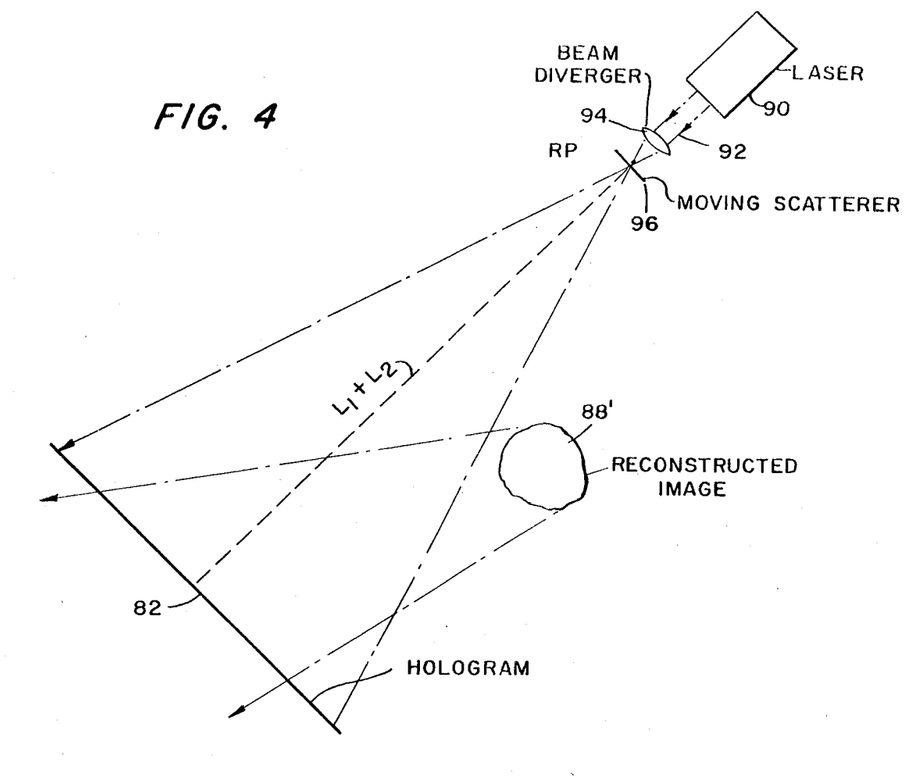
FIG. 4 is another system for reconstructing an image from a hologram produced by the system of FIG. 3 in accordance with the present invention.

Reference will now be made to FIGS. 3 and 4 for a description of further systems wherein a diverging reference and object illuminating beam are employed in constructing the hologram and reconstructing an image of the same. First referring to FIG. 3, the hologram-producing system is seen to include a laser 72 which provides laser light bundle 74 which is passed through an optical system 76 composed of one or more optical elements (i.e., lenses and mirrors) which, in combination, produces a diverging coherent beam 78. The diverging beam 78 is reflected by mirror 80 and produces at the hologram-recording medium 82 (i.e., photographic film) a reference beam 84 and an object beam 86. These beams interact as previously described to produce the required interference pattern on the medium or film 82. In this system, the coherent light emanates for all practical purposes from the reference point P. The reference point P is spaced from the hologram 82 by the distance equal to the sum of $L_1$ and $L_2$, measured along the axial ray of the folded reference bundle 78, 84.

In FIG. 4 there is disclosed a reconstruction system for the folded hologram-producing system illustrated in FIG. 3. The reconstruction system is shown for illustrative purposes as not being folded and once again is illustrated with no additional optics to view the reconstructed image 88′ of object 88. In this system, the hologram 82 must be placed at a distance from the reconstruction point RP produced by the laser 90 at a distance equal to the axial distance $L_1 + L_2$. This will assure the same magnification ratio and the lack of optical aberrations. Of course, in a system which can tolerate such change in magnification and/or optical aberrations, the spacing is not critical. As in any reconstruction system, the laser 90 produces a beam 92 which as for the hologram-making system of FIG. 3 is subjected to a beam-diverging optical system 94. This achieves the same degree of divergence as attained with the optical system 76 and mirror 80 in the hologram-making system of FIG. 3.

In accordance with the invention, a moving scatterer 96 is introduced into the reconstruction system spaced toward the hologram 82 from the reconstruction point RP in accordance with the principles heretofore discussed. In the hologram-making and reconstruction systems illustrated respectively in FIGS. 1 and 3, and 2 and 4, the individual path lengths of the reference beam and the object beam have been illustrated as being substantially equal. However, equal path lengths are not required for the making of holograms and the reconstruction of images therefrom. Variations in the respective path lengths may be tolerated, depending upon the coherence length of the laser radiation being employed in the system. Although the illustrative systems have substantially equal reference and object path lengths, it is to be specifically understood that the invention finds useful application in systems wherein the path lengths are radically different from each other, provided of course that they fall within the permissible limits of the laser radiation.

Figure 5:
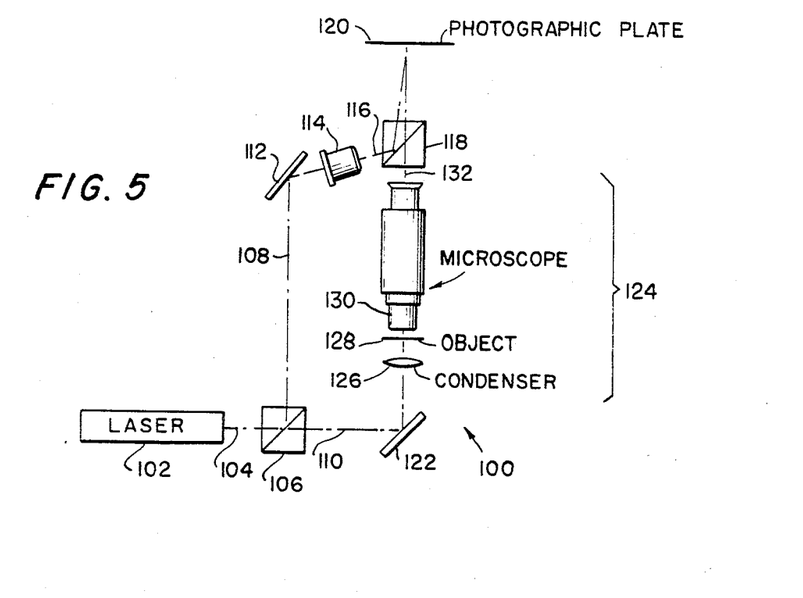
FIG. 5 is still another illustrative hologram constructing system, this one useful in holographic microscopy.

The present invention finds useful application in a wide variety of systems wherein an image is to be reconstructed from a hologram produced in the first instance by a coherent light source of the type producing a characteristic speckle pattern. The invention finds particular application in holographic microscopy where the presence of a speckle pattern seriously interferes with the identification of detail. For example, if a hologram is made of a minute blood cell, the presence of speckle might interfere with the usefulness of the hologram in having a permanent record of the blood cell and the detail thereof. For illustrative purposes, there is shown in FIG. 5, a holographic microscope, generally designated by the reference numeral 100, which includes a laser 102, the beam 104 of which impinges upon a beam splitter 106 which produces a reference beam 108 and an object beam 110. The reference beam 108 is directed by mirror 112 to a microscope objective 114 which functions as a beam diverger with the divergent beam 116 reflecting off a beam splitter 118 onto the photographic plate 120 which makes the holographic record. The object beam 110 is directed by mirror 122 through a conventional microscope 124 having the eye piece removed and including the usual condenser lens 126, the object stage 128 and the magnifying objective 130 which may be focused on the object in the usual fashion. The transmitted object information is contained within beam 132 which passes through beam splitter 118 and interacts with the reference beam 116 to provide the required holographic record 120. Thus, there is provided a permanent and reproducible three-dimensional record of whatever is displayed in the microscope on the stage 128 thereof.

Figure 6:
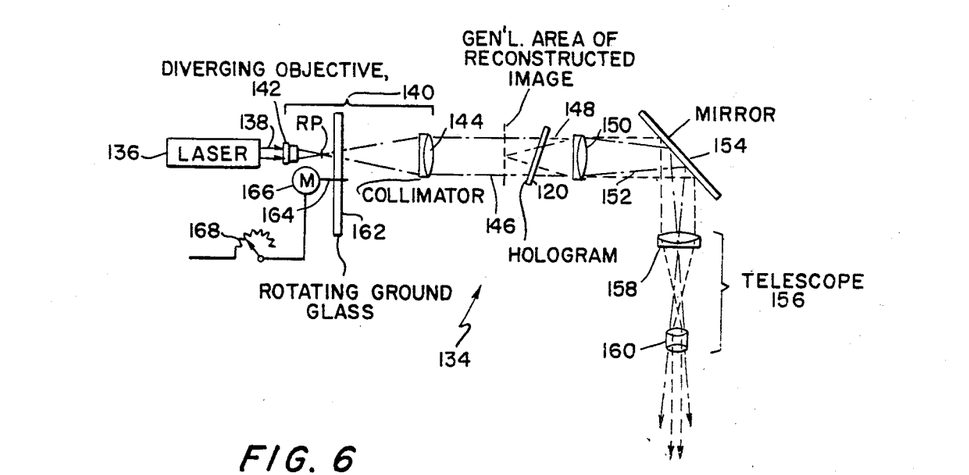
FIG. 6 is a system constructed in accordance with the present invention for reconstructing an image from a hologram produced with the hologram constructing system of FIG. 5.

Reconstruction is achieved in accordance with the present invention by the system illustrated in FIG. 6. The reconstruction system, generally designated by the reference numeral 134 includes a laser 136, the beam 138 of which is subjected to the action of an expander 140 which includes a diverging objective 142 and a collimator 144. The expanded beam 146 passes through the hologram 120. The reconstructed object bundle 148 which emanates from the hologram is collimated by the usual lens system 150, with the collimated beam 152 being directed by mirror 154 to a viewing telescope 156 which includes objective 158 and an eye piece 160. In the holographic-microscopy reconstruction system 134 of FIG. 6, the laser emits a bundle which appears to emanate from reconstruction point RP but which is essentially independent from the reference point in the holographic microscope of FIG. 5 due to the magnification introduced in the object beam by objective 130 prior to recording the object information. In the making of the hologram in the microscope each point is magnified many times before the information related thereto is recorded on the hologram. Thus, in the reconstruction thereof many aberrations introduced by having the reconstruction point aberrated due to any cause (including not relating it to the reference point in the hologram making system) are not significant in relation to the magnified image point being reconstructed by the system.

However, the moving scatterer here illustrated as a rotating ground glass 162 still must be appropriately spaced in relation to the reconstruction point in accordance with the principles heretofore detailed in that these aberrations would be significant in the reconstruction system. The spacing and the permissible degree of adjustment of the ground glass relative to the reconstruction point is related to the angle $\theta$ (FIG. 2D). If the angle $\theta$ is large the spacing is correspondingly small. In this illustrative embodiment, the ground glass is mounted on shaft 164 which is supported on appropriate bearings and it driven from motor 166, the speed of which is controlled by rheostat 168 as is generally understood.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What is claimed is:

1. A method for reducing the speckle background of a holographic image which is reconstructed from a hologram comprising the steps of:
   (1) providing a source of coherent light,
   (2) directing coherent light from said source toward said hologram,
   (3) scattering a small portion of the light from the coherent light source prior to its transmission through the hologram to produce a scattering pattern, and
   (4) continuously varying the scattering pattern produced in step (3).

2. A method for reducing the speckle background of a reconstructed holographic image in accordance with claim 1 wherein said coherent light is made to emanate from an effective point source and said scattering is carried out close enough to said point source to prevent unacceptable loss of resolution in the reconstructed image and far enough away from said point source to provide acceptable uniformity in the speckle background of the reconstructed image.

3. A method for reducing the speckle background of a reconstructed holographic image in accordance with claim 2 wherein said varying scattering is produced by continuously moving a ground glass plate in the path of said coherent light.

4. A method for reducing the speckle background of a reconstructed holographic image in accordance with claim 3 wherein said ground glass plate is placed at a distance away from said effective point source which is less than $d/(2 \tan \theta)$, where $\theta$ is the angle between lines drawn tangent to the sides of the forward lobe of said ground glass plate and $d$ is the maximum diameter of the expansion of said effective point source before there results an unacceptable loss of resolution.

5. A method for reducing the speckle background of a reconstructed holographic image in accordance with claim 1 wherein said varying scattering is produced by changing the position of a scatterer in the path of said coherent light.

6. A method for reconstructing a holographic image from a hologram comprising the steps of:
   (1) providing a source of coherent light,
   (2) directing coherent light from said source toward said hologram, and
   (3) variably scattering said coherent light prior to transmission through said hologram to produce a first set of mutually reinforcing images and a second set of images which when added together constitute a substantially uniform background noise level for the reinforcing images.

7. Apparatus for reconstructing a holographic image from a hologram comprising a source of coherent light, means for directing said coherent light through said hologram, means for scattering a small portion of the light from said coherent source prior to its transmission through said hologram, and means for continuously varying the scattering pattern of said small light portion.

8. Apparatus for reconstructing a holographic image from a hologram in accordance with claim 7 wherein said coherent light source is effectively a point source, and said means for scattering said small portion of said light is located close enough to said effective point source to prevent unacceptable loss of resolution in the reconstructed image and far enough away from said effective source to provide acceptable uniformity in the speckle background of the reconstructed image.

9. Apparatus for reconstructing a holographic image from a hologram in accordance with claim 8 wherein said scattering means is a ground glass plate positioned in the path of the light from said coherent source, and said varying means continuously moves said ground glass plate in the path of said light.

10. Apparatus for reconstructing a holographic image from a hologram in accordance with claim 9 wherein said ground glass plate is placed at a distance away from said effective point source which is less than $d/(2 \tan \theta)$, where $\theta$ is the angle between lines drawn tangent to the sides of the forward lobe of said ground glass plate and $d$ is the maximum diameter of the expansion of said effective point source before there results an unacceptable loss of resolution.

11. Apparatus for reconstructing a holographic image from a hologram in accordance with claim 7 wherein said varying means continuously changes the position of said scattering means.

References Cited

Kirkpatrick et al., Jour. of the Optical Soc. of Am., vol. 46, No. 10, October 1956, pp. 825–831.

Stroke et al., Physics Letters, vol. 15, No. 3, April 1965, pp. 238–240.

DAVID SCHONBERG, Primary Examiner

R. J. STERN, Assistant Examiner